Dec. 1, 1964 J. W. HARRISON ETAL 3,159,520
SHRINKABLE BANDS
Filed Dec. 27, 1960 2 Sheets-Sheet 2

United States Patent Office 3,159,520
Patented Dec. 1, 1964

3,159,520
SHRINKABLE BANDS
John W. Harrison and Robert D. Lowry, Winchester, Mass., assignors to W. R. Grace & Co., Cambridge, Mass., a corporation of Connecticut
Filed Dec. 27, 1960, Ser. No. 78,649
3 Claims. (Cl. 156—272)

This invention relates to the formation of thick plastic films having shrinking properties.

Because it is difficult to extrude and biaxially orient thick plastic films, e.g., films of thickness over 2 mils, it is an object of the present invention to prepare thick biaxially oriented plastic films by a novel procedure.

Another object is to prepare a thick film of irradiated biaxially oriented polyethylene having superior shrink energy, greater strength, and improved puncture and abrasion resistance.

A further object is to provide a thick, shrinkable, irradiated polyethylene band that is suitable as a binding or fastening agent.

Other objects are to provide a method and apparatus for forming thick, shrinkable, plastic films.

Figure 1:
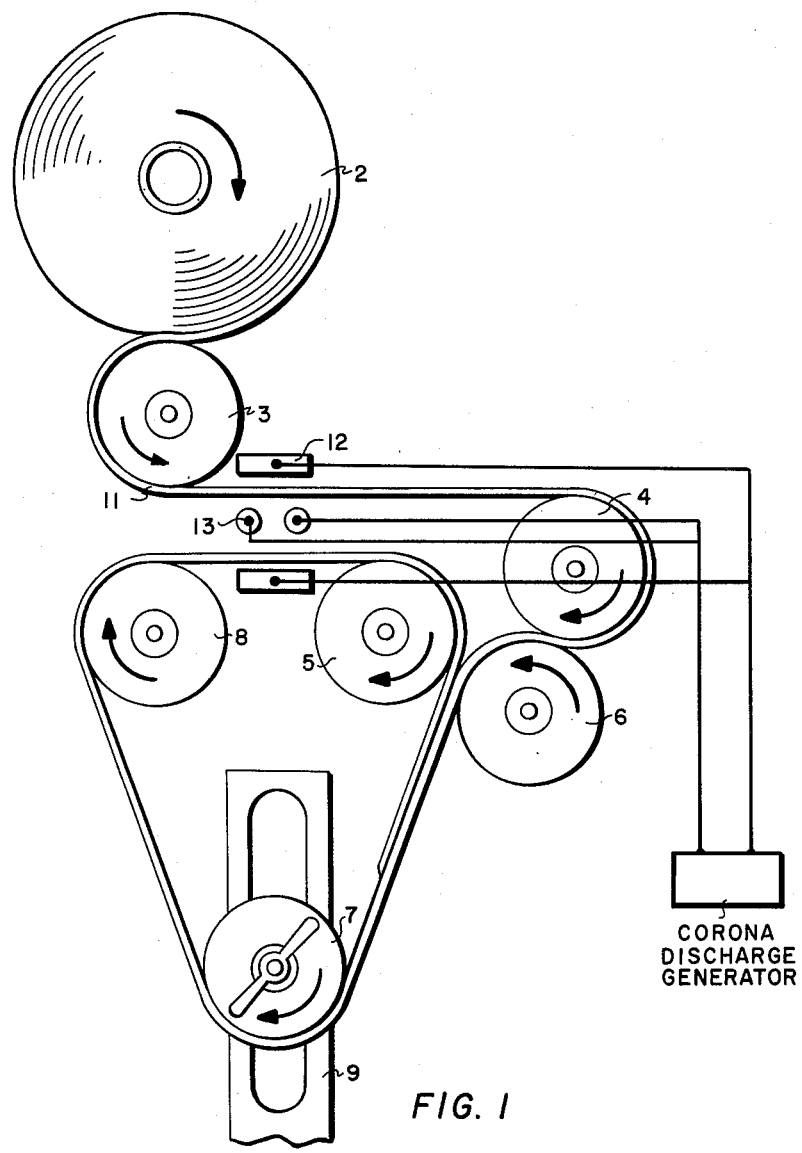

Other objects and advantages of the present invention will become apparent in the following detailed description of the invention, wherein reference is made to the accompanying drawings in which:

FIGURE 1 is a schematic representation of the method and apparatus of the invention used to prepare the thick shrinking band of plastic film.

Figure 2:
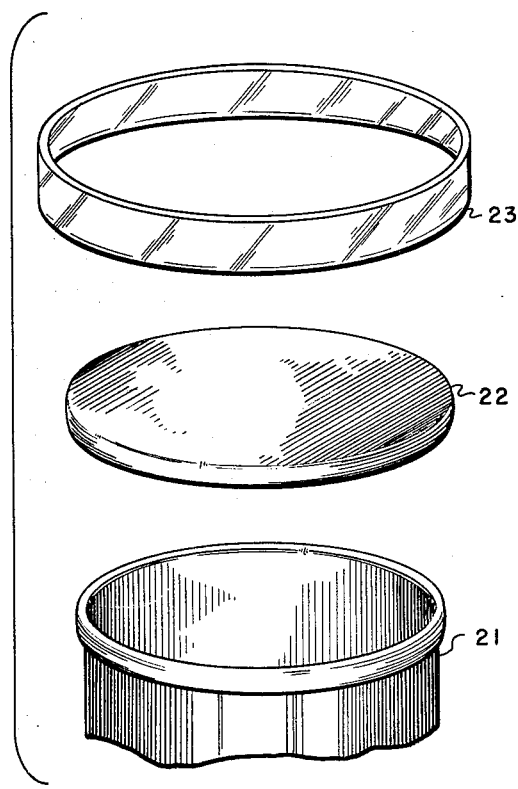
Figure 3:
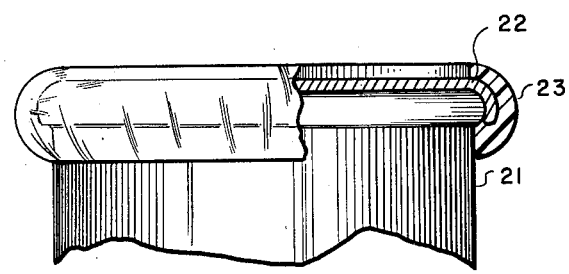

FIGURES 2 and 3 disclose one of the many uses of the thick shrinking bands of this invention.

It is not presently possible to orient thick irradiated polyethylene films and as a result it is not possible to obtain relatively thick heat-shrinkable polyethylene films. Heat shrinking properties are produced in polyethylene by heating polyethylene film to an elevated temperature at which the polyethylene will become stretchable, stretching to orient the heated polymer, and then cooling the polymer while under tension to a temperature at which the polymer will retain its stretched or oriented form when tension is released. In effect the polymer molecules are stretched or oriented and "frozen" in this stretched or oriented position. The subsequent application of heat to the polymer "thaws" the polymer and permits the polymer molecules to return to their original non-stretched position.

It has now been found that it is possible to prepare a thick, i.e. over 2 mils, irradiated, biaxially oriented polyethylene film which possesses the same superior shrinking qualities, high tensile strength and high shrink energy of film of thinner guage while possessing the increased strength of the thicker film. This increased strength coupled with the excellent shrinking properties make the thickened plastic film suitable for use in many instances where the thinner film would have been unsuitable.

This invention results in the production of a thick band, i.e. an endless belt or loop of varying size and width of heat-shrinkable, irradiated polyethylene. The thick band is formed by laminating thin sheets of heat-shrinkable polyethylene together. This lamination is produced without the aid of heat, pressure or adhesive coatings. The band of film may be as thick as is desired for the particular application. Generally 2 to 25 layers will suffice.

Referring to the drawings there is provided a supply roll 2 of 0.8 mil thick irradiated, biaxially oriented polyethylene film (Alathon 14 irradiated to an extent of about 12 megarads and biaxially stretched 350% in each direction). The film 11 is drawn from the supply roll over a first driven roll 3 and thence over a second driven roll 4. Between the first and second driven rolls one surface of the film is exposed to a high voltage electric stress created by a corona type, electrostatic discharge apparatus, specifically a Howard electrostatic treater which is a 15,000 volt, single ended neon tube. Located above the electrostatic discharge apparatus on the opposite side of the film is a metallic surface 12 appropriately grounded. The treated film passes through the nip formed by a 3rd driven roll 5 and a first idler roll 6. The idler roll 6 is urged against the 3rd driven roll 5 by a spring. The idler roll 6 is also movable in a direction away from the driven roll 5. The film, after passing through the nip of the rolls, passes over a second idler roll 7, over a fourth driven roll 8, and thence over the 3rd driven roll 5. Between the driven rolls 8 and 5 the surface of the film which had not previously been exposed to the electrostatic discharge apparatus is now electrostatically treated. The film travels over the third driven roll 5 and into the nip between roll 5 and roll 6 where the electrostatically treated surface of the film passing through the nip in the rolls for the second time contacts the electrostatically treated surface of the film passing through the nip for the first time. As the electrostatically treated surfaces come in contact they adhere to each other. The film continues to travel about rolls 5, 7 and 8 until a band of film of sufficient thickness is built up. When a band of desired thickness has been formed, the idler roll 6 is swung away from driven roll 5 and the film end may then be cut. The idler roll is swung in a radius pivoted around the center of roll 4 to retain the cut end. The band is then removed from the rolls.

The idler roll 7 is adjustably mounted on a slotted bar 9. The rolls 8 and 5 are mounted in fixed positions. By moving the position of the idler roll 7 along the slotted bar away from or towards the fixed rolls 8 and 5 the size of the band of thickened film may be varied within certain limits.

The electrostatic discharge apparatus can be any one of the conventional corona discharge apparatus, including the Howard electrostatic treater, or the Mancib treater, or apparatus of the type disclosed in British Patent 715,914, and British Patent 771,234. Preferably, the corona discharge apparatus is a neon transformer capable of delivering at least 10,000 volts at 5 to 40 milliamperes A.C. Corona discharge is produced by ionizing the gap between a pair of electrodes. The gap between the electrodes is such that with the application of a particular voltage corona discharge, without arcing, is obtained.

In general, there is employed in the invention polyethylene film which has been irradiated and biaxially oriented. The film may be irradiated to an extent of from 2 to 100 megarads, preferably 6 to 20 megarads. The irradiation may be accomplished in conventional fashion, e.g., by the use of electron beam generators such as the 2 million volt General Electric resonant transformer electron beam generator. The biaxial orientation is carried out to an extent of 100 to 700% longitudinally and 100 to 900% laterally. The irradiation and orientation may be carried out as described in U.S. Patent 2,877,500 to Rainer et al. and in the copending U.S. application Serial No. 713,848, filed February 7, 1958, to Baird et al., both of which are hereby incorporated by reference. The irradiated and biaxially oriented polyethylene employed in this invention has a tensile strength of at least 5000 p.s.i. at 21° C. and a shrink energy of at least 100 p.s.i. in each direction at 96° C.

The polyethylene film is Du Pont Alathon 14, a high pressure, branched chain polyethylene having a melt index of 1.8, an average molecular weight of 20,000 and a density of 0.916. Other polyethylenes with different molecular weights may be employed including low, medium and high density polymers produced by high or low pressure techniques and blends of such polymers.

The corona discharge treated irradiated, oriented polyethylene surface will permanently bond to a similarly treated polyethylene surface without the use of heat or pressure. This self-adhesiveness is so great that the film will tear rather than delaminate.

The irradiated polyethylene film may be uniaxially or biaxially oriented. Non-oriented polyethylene and non-irradiated polyethylene do not have this ability to be made self-adhesive by electrostatic treatment.

The strong, shrinkable bands or loops of irradiated polyethylene may be employed to seal duct work joints, to bind a plurality of objects together and may be used to hold lids on containers or barrels. There is shown in FIGURE 2 a metal drum 21, a metal lid 22 which is adapted to cover the open top of said metal drum and which fits over the beaded rim of the drum, and a band 23 of biaxially oriented, irradiated polyethylene which is approximately 8 mils thick, 2 inches wide and slightly larger than the outside dimensions of the drum and lid. The lid is fitted upon the drum and the film band is placed around the lid, extending above the drum and below the beaded edge of the drum. The film band is heated shrunk around the rim and locks the lid to the drum as shown in FIGURE 3.

The invention described in detail in the foregoing specification is susceptible to changes and modifications as may occur to persons skilled in the art without departing from the principle and spirit thereof. The terminology used is for purpose of description and not of limitation, the scope of the invention being defined in the claims.

We claim:
1. A process for preparing a laminated band comprising orienting polyethylene film, irradiating said oriented film to an extent of 2 to 100 megarads, subjecting both film surfaces to corona discharge sufficient to effect adherence of the surfaces to each other in the absence of significant heat and pressure, and forming a continuous band from said treated film by wrapping a plurality of layers of film about a form.
2. A process for preparing a heat shrinkable laminated band comprising biaxially orienting polyethylene film 100 to 700% longitudinally and 100 to 900% transversely, irradiating said oriented film to an extent of 2 to 100 megarads, subjecting both film surfaces to corona discharge sufficient to effect adherence of the surfaces to each other in the absence of significant heat and pressure, forming a continuous band from said treated film by wrapping 2 to 25 layers of said film about a form and removing the resultant band from said form.
3. A process for preparing a heat shrinkable laminated band comprising biaxially orienting polyethylene film 100 to 700% longitudinally and 100 to 900% transversely, irradiating said oriented film to an extent of 6 to 20 megarads, subjecting one surface of said film to corona discharge, forming a continuous band by wrapping said film about a form, said treated surfaces being interiorly positioned, subjecting the exterior previously untreated surface to corona discharge while said film is on said form but before it contacts the first treated surface, the corona discharge treatment being sufficient to effect adherence of the film surfaces to each other in the absence of significant heat and pressure, continuing said wrapping and corona treatment until the resultant band contains 2 to 25 laminae, and removing said band from said form.

References Cited by the Examiner
UNITED STATES PATENTS

| | | | |
|---|---|---|---|
| 2,388,541 | 11/45 | Henderson | 156—189 |
| 2,723,933 | 11/55 | Isenberg | 156—189 |
| 2,810,933 | 10/57 | Pierce et al. | 156—272 |
| 2,881,470 | 4/59 | Berthold et al. | 156—272 |
| 2,894,139 | 7/59 | Magruder et al. | 250—49.5 |
| 2,922,883 | 1/60 | Giaimo | 250—49.5 |
| 2,923,964 | 2/60 | Plonsky | 156—272 |
| 3,018,189 | 1/62 | Traver | 156—272 |
| 3,054,708 | 9/62 | Stainberg | 156—272 |
| 3,067,119 | 12/62 | Ramaika | 156—272 |
| 3,081,214 | 3/63 | Strome | 156—272 |

EARL M. BERGERT, *Primary Examiner.*

ARTHUR GAUSS, *Examiner.*